July 31, 1962 A. FORTIER 3,047,234
PNEUMATICALLY OPERATED CONTROL DEVICES
Original Filed Feb. 28, 1958
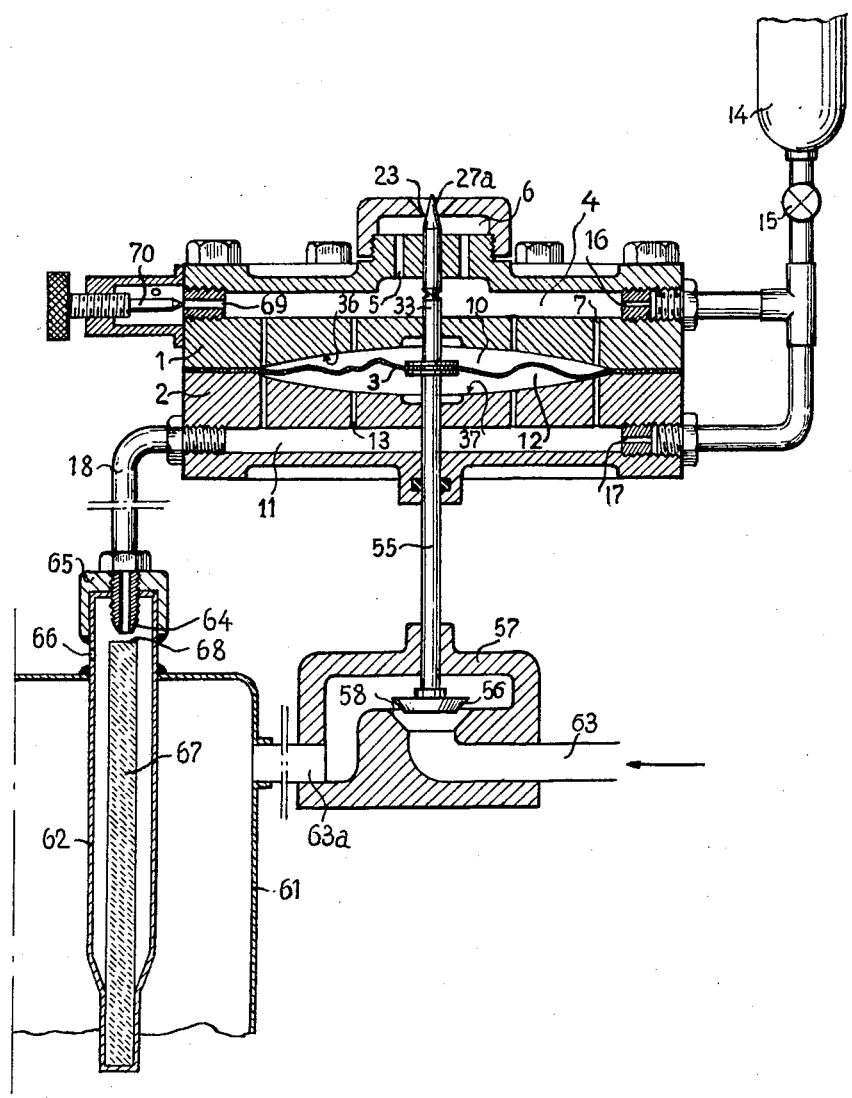

United States Patent Office 3,047,234
Patented July 31, 1962

3,047,234
PNEUMATICALLY OPERATED CONTROL
DEVICES
André Fortier, 12 Rue Léon Cambillart, Clamart, France
Original application Feb. 28, 1958, Ser. No. 718,193. Divided and this application July 9, 1959, Ser. No. 830,979
Claims priority, application France Mar. 6, 1957
3 Claims. (Cl. 236—87)

This is a division of my copending U.S. patent application Ser. No. 718,193, filed February 28, 1958, in which a pneumatic gauge based on the principle of the Wheatstone bridge has been described. Such pneumatic gauges usually comprise two chambers fed independently from a common source with gas under pressure through restricted passages and one of which has a reference outlet, while the other one is provided with a gauging outlet; said chambers are separated by a pressure sensitive member adapted to perform a functional operation, such as actuating an index, establishing electric contacts, etc. in response to upsetting of the fluent pressure equilibrium between the chambers due to variations of the gauging passage.

In the pneumatic gauge described in my above-mentioned application, the pressure sensitive member which separates the two gas chambers is constituted by a folding wall made of pliable substantially non-elastic material and disposed between a pair of perforated concave members, the surface area of the folding wall being adapted to engage the surface of one or the other of said concave members so as to conform to said surface when abutting against the latter. It will be easily understood that such folding wall or diaphragm offers practically no elastic force tending to resist its change of configuration under the action of the pressure differences, and that substantially no tension will result in the folding wall or diaphragm when the latter engages one or the other of said concave members.

Moreover, such folding wall or diaphragm is neutral in any position, provided that it is subjected on both sides to equilibrium forces; in other words, its operation does not depend on the absolute value of the feeding pressure, so that the same may be varied, at will, or due to non-uniformity of the feeding source, without introducing errors in the behavior of the diaphragm. In an apparatus based on a well-defined elasticity of a diaphragm, one has the drawback of finding said elasticity changing with time.

The general object of the invention is to adapt the pneumatic gauge described in my above-mentioned copending U.S. patent application to a condition controlling or regulating device for operating the latter in response to condition changes.

Therefore, a feature of the invention relates to the combining of said pneumatic gauge with a control valve of any suitable character for controlling liquid level, temperature or the like, with the pressure differential applied to the pliable diaphragm of the gauge being in accordance with the variations in pressures, liquid level, or temperatures being controlled, whereby the control valve is operated in direct accordance with the variations in the particular variable being controlled.

It is still a further object of the invention to adapt a pneumatic gauge of the type described for use in connection with a control device of any suitable character for actuating said control device when an undesirable or dangerous or other predetermined condition arises.

Another feature of the invention relates to the combining of a pneumatic gauge of the type described with a fluid flow control valve adapted to control the heat supply to a heat consuming device, such as a boiler, drier or the like, to be continuously maintained at a given temperature, the pneumatic gauge being effective on increase of said given temperature in the heat consuming device to effect the actuation of said control valve to thereby decrease, or to shut off, the said heat supply.

It is to be understood that the invention insofar as it relates to the actuation of a control device in direct accordance with the variation of the particular condition to be controlled, can be combined with a wide variety of condition responsive means and with a wide variety of control devices to be actuated by the pneumatic gauge under the control of said condition responsive means, but for the purposes of illustration the pneumatic gauge will be hereinafter described as embodied in a control system responsive to thermal conditions.

Referring to the drawing, in which the FIGURE shows a diagrammatic view of a temperature control system in accordance with the present invention, the pneumatic gauge comprises a casing made of two parts 1, 2, between which is clamped the marginal portion of a diaphragm 3, circular in the example shown, separating a hollow space formed in the casing 1, 2, into two chambers.

In the drawing, the upper one of the said chambers comprises a duct 4 drilled through the upper casing part 1, an upper compartment 6 provided in a member 8 screwed on the said casting part 1 and the space 10 situated between the diaphragm 3 and the said casing part 1. Suitable ports 5 and 7 provide communication between the spaces 4, 6, and the upper gas chamber 10.

Similarly, the lower gas chamber comprises a duct 11 drilled through the lower part 2 of the casing and space 12 formed between the diaphragm 3 and the said casing lower part 2, ports 13 being provided to establish a communication between the ducts 11 and the space 12 of the said lower gas chamber. Both chambers are fed in parallel from a common source of compressed gas, such as the gas flask 14, under the control of suitable valve means such as a cock 15. The ducts 4 and 11 of the upper and lower gas chambers, respectively, are fed through calibrated inlets 16 and 17, respectively.

The upper chamber 6 has an outlet 23 controlled by a needle valve 27a which bears on diaphragm 3 through a mushroom shaped member 33.

The diaphragm 3 is made of a practically non-elastic folding material, such as thin leather, so as to be easily pliable and its changes of configuration under the action of the pressure differences are limited by two arresting surfaces constituted, in the example shown, by concave spherical walls 36 and 37 of the upper and lower parts 1 and 2, respectively, of the casing. The spacing of these arresting surfaces has been considerably exaggerated to make the arrangement more easily understood. The surface area of the diaphragm 3 is taken equal to the area of the concave walls 36—37 so that in both its extreme positions, the diaphragm 3 bears on the said walls without being subjected to any tensional strain, but also without being folded. In any position intermediate between the said extreme positions, the diaphragm 3 folds as shown in an exaggerated manner in the drawing.

The control system further includes a heater or drier structure indicated generally at 61 and adapted to accumulate heat from a gaseous fluid, steam or vapor conducted into the heater or drier through two pipelines 63, 63a interconnected by a valve housing 57 having a valve seat 58 therein. A valve 56 is supported at the lower end of a valve stem 55 which projects upwardly and outwardly through the top housing 57 for vertical sliding movement, the valve 56 being adapted to engage seat 58 and when in a seated position, to close the communication between the pipelines 63 and 63a. Obviously, when the valve 56 is unseated, the heated gas steam, or vapour supplied from a suitable source (not shown) may flow through pipeline 63, housing 57, and pipeline 63a into the heater or drier 61.

An elongated casing 62 positioned within the drier 61 has a top position projecting outwardly through the upper wall of the drier and provided with an opening for reception of an externally threaded jet plug 64 which extends through the threaded central aperture of a cap member 65 fixedly secured on said top portion of casing 62. The plug 64 is connected by pipe 18 to the duct 11 of the pneumatic gauge and pressure fluid conducted from duct 11 through pipe 18 and plug 64 into casing 62 may escape from the latter through an opening 66 formed in the outwardly projecting top portion of casing 62 and large enough to permit substantially unrestricted flow therethrough. The casing 62 supports a variable flow restriction member 67 having a face 68 positioned in such spaced relation to the inner end of jet plug 64 as to determine a restricted passage of pressure fluid between the jet plug and the face 68 of member 67. The casing 62 is made of a material having a greater coefficient of expansion than that of the material of which the flow restriction member 67 is made whereby the heat in drier 61 will cause greater expansion of casing 62 than of the flow restriction member 67 so as to increase the distance between plug 64 and the face 68 of the flow restriction member 67. It will now be apparent that casing 62 and flow restriction member 67 constitute together a temperature sensitive device effective to vary the free section for the passage of pressure fluid discharged through plug 64, the arrangement being such that the pressure in duct 11 and space 12 of the pneumatic gauge will decrease on increase of temperature in drier 61.

The upper space 4 of the gauge communicates with the atmosphere not only through the outlet 23, but also through a second outlet 69, a manually adjustable needle valve 70 permitting to vary the rate of discharge of pressure fluid from the upper space 4 independently of the rate discharge through outlet 23 controlled by the needle valve 27a.

The valve stem 55 is connected to the differential pressure sensitive diaphragm 3 of the gauge for movement therewith and in the particular embodiment of the invention illustrated in the figure, the valve 56 will be maintained unseated by the diaphragm 3 as long as the latter is in neutral position, that is, as long as the temperature sensitive device 62—67 remains in an unexpanded condition. As heretofore pointed out, when a heated gas is supplied to the drier 61 through the open valve 56, this heat supply will cause a greater expansion of casing 62 than of the variable restriction member 67 so that the latter will be moved away from the jet plug 64 whereby the resulting increase of the rate of discharge of gas through the jet plug will cause a corresponding decrease of the pressure in space 12 of the gauge. Such decrease of pressure in space 12 will permit the pressure acting on the upper face of the diaphragm to move the valve 56 towards its seat 58 to thereby adjust or shut off the heat supply to drier 61 in direct accordance with the degree of temperature sensed by the temperature sensitive device 62—67 enclosed in the drier.

It should, of course, be understood that the description and drawing herein are illustrative merely, and that various modifications and changes may be made in the structure and operation disclosed without departing from the spirit of the invention.

What is claimed is:

1. In a variable condition responsive flow restriction system, comprising a casing having a pair of separate gas chambers therein and means for admitting a restricted flow of gas under pressure into each of said chambers, the combination of a pressure sensitive wall common to said chambers and consisting of pliable substantially non-elastic foldable material, concave wall means in said chambers to limit the displacement of said pressure sensitive wall, the surface area of said pressure sensitive wall adapted to engage the concave wall means and adapted to conform to said surface when abutting against said concave wall means whereby substantially no tension results in said pressure sensitive wall when it is in the concave wall means abutting position, a variable flow restriction means operated by means responsive to a condition, one of said chambers having an outlet connected to said variable flow restriction means and the other chamber having an outlet, a valve controlling said last-mentioned outlet, said valve being connected with said pressure sensitive wall for movement therewith, and means for controlling the condition to which said variable flow restriction means are responsive, said control means including a movable element connected for movement with said pressure sensitive wall and adapted to change said condition in accordance with the displacements of the pressure sensitive wall.

2. A system according to claim 1, wherein manually adjustable valve means are provided to vary the rate of discharge of gas from said other chamber independently of the axial displacements of the folding wall.

3. A system according to claim 1, wherein said variable flow restriction means are responsive to thermal conditions so as to vary the rate of discharge of gas from said one chamber in accordance with changes of temperature, and wherein said movable element is adapted to control said temperature in accordance with said axial displacements of the folding wall.

References Cited in the file of this patent

UNITED STATES PATENTS

| | | |
|---|---|---|
| 680,423 | Winkenwerder | Aug. 13, 1901 |
| 710,301 | Powers | Sept. 30, 1902 |
| 1,046,236 | Wagner | Dec. 3, 1912 |
| 1,455,633 | Lundgaard | May 15, 1923 |
| 1,579,536 | Hodgson | Apr. 6, 1926 |
| 2,571,557 | Fortier | Oct. 16, 1951 |
| 2,775,231 | Silver | Dec. 25, 1956 |

FOREIGN PATENTS

| | | |
|---|---|---|
| 278,689 | Germany | Oct. 2, 1914 |